United States Patent

Walsh

[15] 3,704,045
[45] Nov. 28, 1972

[54] FLUIDICALLY CONTROLLED ANTISKID VEHICLE BRAKE SYSTEM

[72] Inventor: Edward G. Walsh, Galena, Ohio

[73] Assignee: Bell Telephone Laboratories, Incorporated, Murray Hill, N.J.

[22] Filed: Nov. 14, 1969

[21] Appl. No.: 876,824

[52] U.S. Cl. ............... 303/21 F, 137/81.5, 235/201, 303/61, 303/84 A
[51] Int. Cl. ............................................. B60t 11/10
[58] Field of Search ................... 303/21, 24, 61–63, 303/68–69, 6, 84 A; 188/181; 235/201; 137/81.5

[56] References Cited

UNITED STATES PATENTS

| 2,959,012 | 11/1960 | Johnson.................303/61 X |
| 3,185,166 | 5/1965 | Horton et al. .235/201 PF UX |
| 3,270,932 | 9/1966 | Smith.....................235/201 X |
| 3,361,487 | 1/1968 | Vriend.......................303/61 |
| 3,404,923 | 10/1968 | Smoren .....................303/61 |
| 3,466,098 | 9/1969 | Pieren et al..............303/61 X |

OTHER PUBLICATIONS

"Fluidics," Edited by Humphrey et al., Fluidic Amplifier Associates, Copyright 1965.

Primary Examiner—Duane A. Reger
Assistant Examiner—John J. McLaughlin
Attorney—R. J. Guenther and Edwin B. Cave

[57] ABSTRACT

An improved fluid actuated vehicle braking system is disclosed that combines continuous braking action of the vehicle with intermittent braking at the vehicle wheels. Insertion of a fluidic flip-flop between the master cylinder and the wheel cylinders permits alternate application of the front and rear brakes. Depression of the brake pedal results in continuous deceleration of the vehicle since one or the other brake is continuously operated. At the same time, the possibility of the vehicle skidding is minimized by the intermittent braking action at each wheel which prevents "locking" of any wheel.

1 Claim, 4 Drawing Figures

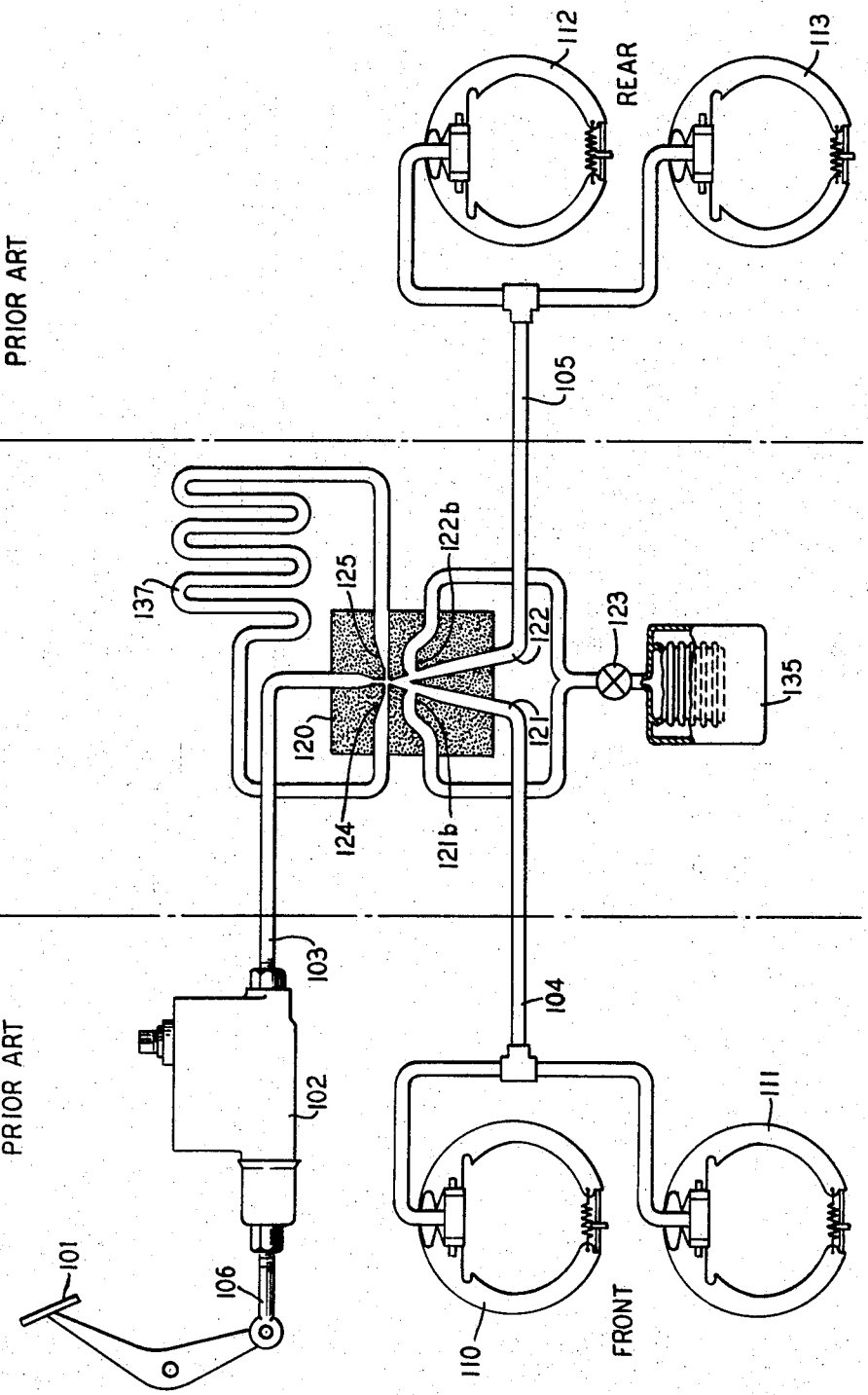

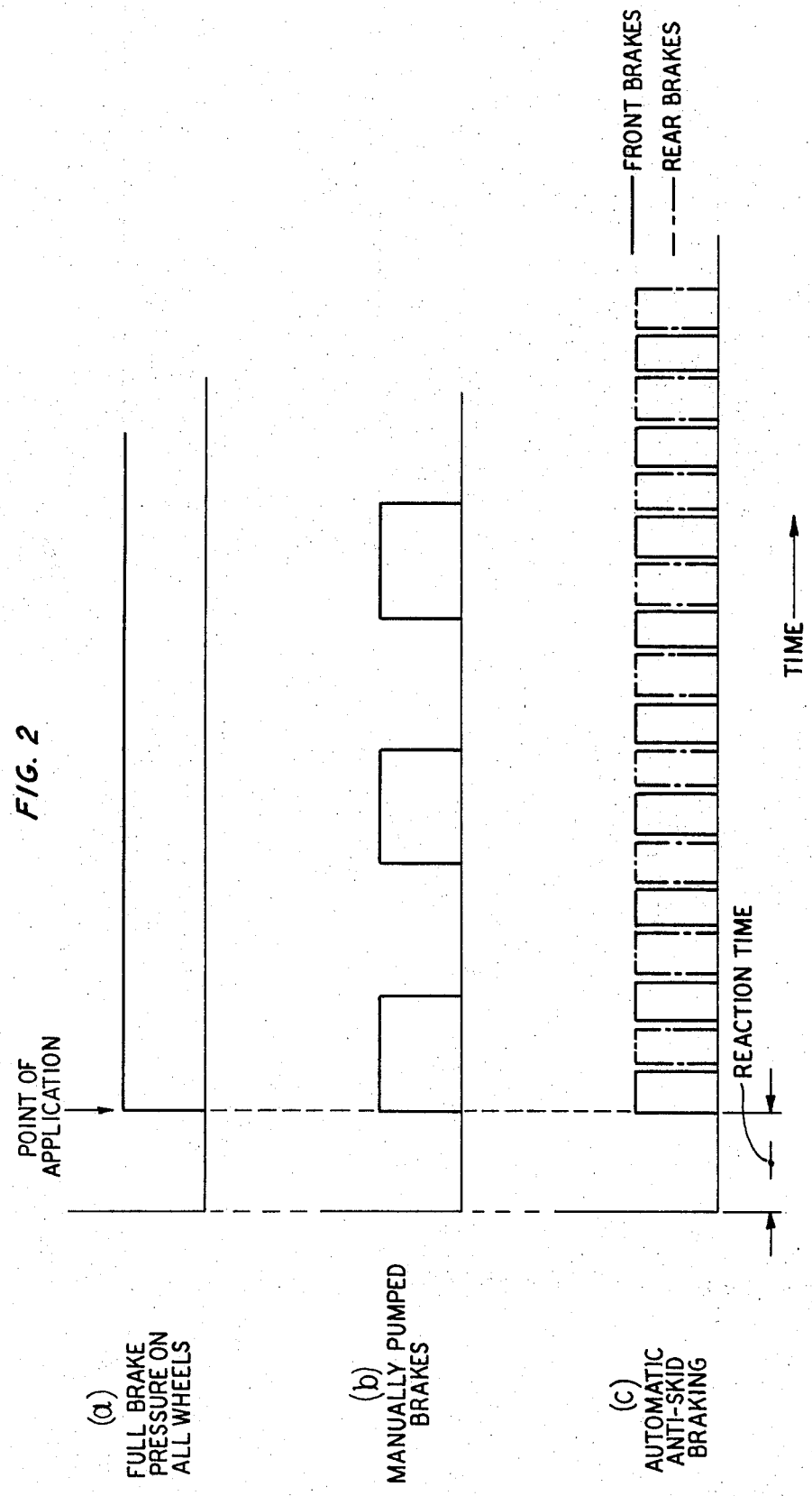

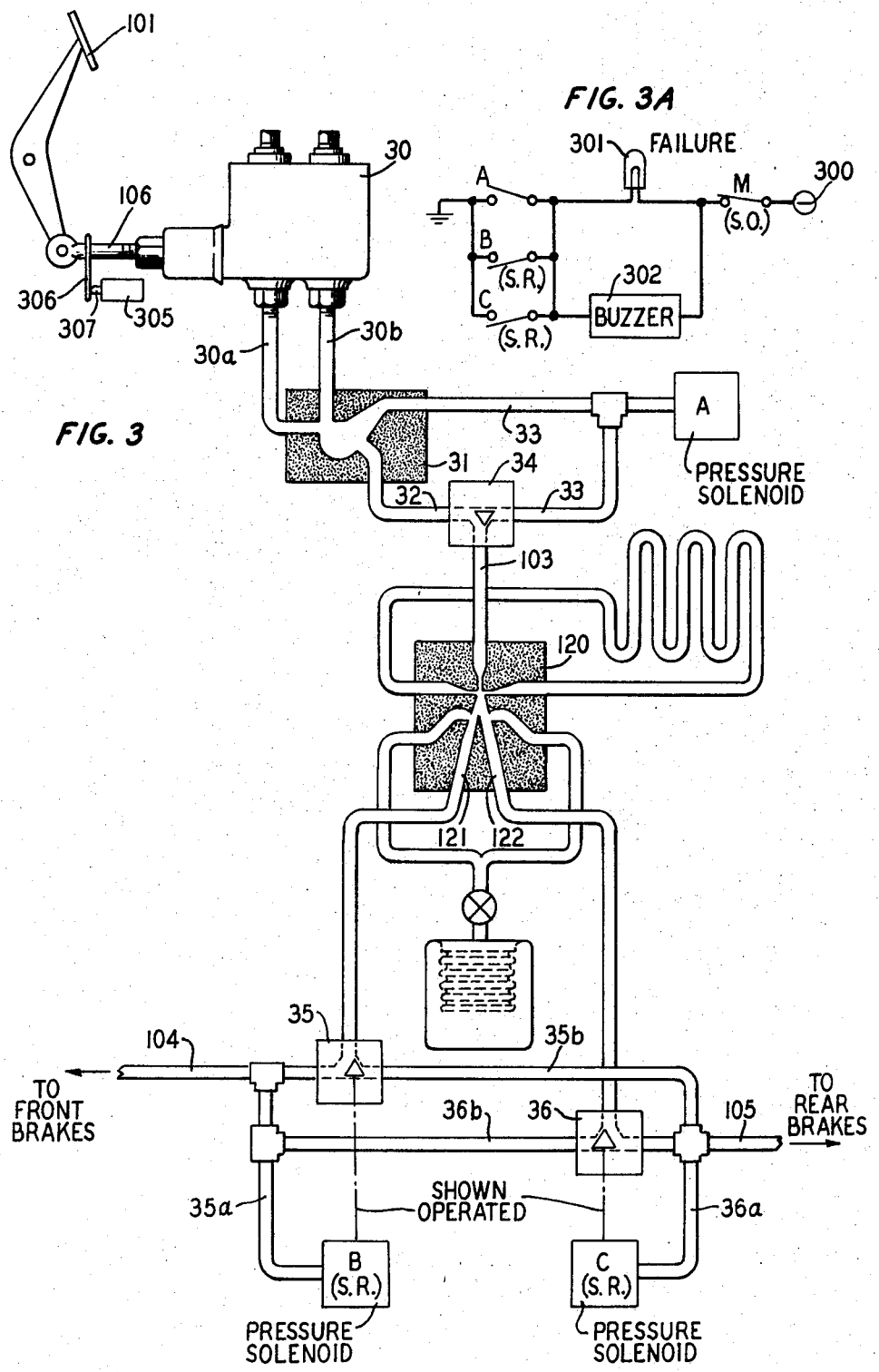

FLUIDICALLY CONTROLLED ANTISKID VEHICLE BRAKE SYSTEM

This invention relates to fluid actuated vehicle braking systems and, more particularly, to such systems that are adapted for antiskidding.

FIELD OF THE INVENTION

Antiskid brake systems have been proposed in the past. Significant limitations of these prior art systems include either the need for some skid sensing device associated with each wheel of the vehicle, the necessity for a vibrating diaphragm, or the necessity for an electrical timer and related switching. Since the desirability of having safety features on automobiles must always be conditioned upon commercial and economic considerations, it should be apparent that any system capable of simplifying the antiskid arrangement and lowering its cost would contribute substantially to its wider use. My invention provides a system capable of providing the antiskid feature without the necessity for, and resultant expense of, such skid sensing devices, diaphragms or electrical timers.

SUMMARY OF THE INVENTION

In an illustrative embodiment of my invention, the output of the master cylinder of an automotive fluid braking system is distributed to the wheel cylinders through a fluidic flip-flop having one output connected to the front brakes and the other output connected to the rear brakes. Depression of the brake pedal causes pressurized fluid to be supplied alternately to the front brakes and to the rear brakes. This provides continuous deceleration of the vehicle, since at all times either the front or rear brakes are actuated. At the same time, wheel locking and resultant skidding is prevented by the intermittent actuation of each brake.

BRIEF DESCRIPTION OF THE DRAWING

FIG. 1 is a schematic view of a system embodying my invention;

FIG. 2 is a comparative graph showing the braking actions of my invention and the prior art;

FIG. 3 is a schematic view of a "fail safe" system embodying my invention; and

FIG. 3A is a schematic of a failure warning circuit used in conjunction with the system of FIG. 3.

DESCRIPTION OF THE ILLUSTRATIVE EMBODIMENTS

The system shown in FIG. 1 includes the prior art system comprising an actuating brake pedal 101, an actuating rod 106, a master cylinder 102, a fluid conduit 103, fluid conduits 104 and 105, front brakes 110 and 111, and rear brakes 112 and 113. Conventionally, fluid conduit 103 connects directly to fluid conduits 104 and 105 and pressurized fluid from master cylinder 102 is applied simultaneously to all four brakes.

Using my invention, the normal connection of conduits 103, 104, and 105 is interrupted and a fluidic control device is inserted. The output of master cylinder 102, which is carried by conduit 103, is applied to the inlet of a fluidic flip-flop 120. A first output 121 of flip-flop 120 connects to conduit 104 to control the actuation of front brakes 110 and 111. A second output 122 of flip-flop 120 connects to conduit 105 to control the operation of rear brakes 112 and 113. The state of flip-flop 120 is controlled by a feedback loop 137.

With brake pedal 101 in its unoperated position, the system is filled with fluid but is in a static condition. When brake pedal 101 is depressed, a dynamic condition is initiated in which fluid starts to flow through the system. The fluid flow enables fluidic device 120 which is effective for controlling the flow.

Flip-flop 120, in combination with feedback loop 137, acts as an oscillator to alternately activate output 121 and output 122.

As described in detail in *Fluidics*, by Fluid Amplifier Associates, copyright 1965, at page 16, the length of loop 137 is equal to one-half the wavelength of the oscillating frequency. Since outlets 121 and 122 are alternately activated, the respective front and rear brakes will be operated alternately.

When the fluid jet from conduit 103 switches to the left side wall of flip-flop 120, the viscous friction of the jet past signal port 124 causes a rarefaction at port 124. This rarefaction is reflected as a wavefront through feedback loop 137. At the same time, single port 125 is pressurized, generating a pressure front through loop 137. The pressure wave and the rarefaction wave cross in feedback loop 137 and continue to the opposite ends of the loop. The pressure front will reach signal port 124 at the same time that the rarefaction wave reaches signal port 125. Since the fluid jet effectively closes off both ports, the wavefronts are reflected back through feedback loop 137. At the same time, the rarefaction at port 125 and the pressurization at port 124 results in a pressure differential across the jet and causes it to switch to the right wall of flip-flop 120.

When the reflected waves reach the opposite ports, once again port 124 will be rarefied and port 125 will be pressurized. As a result, the jet will switch back to the left wall of flip-flop 120 and the wavefront will again be reflected. In this way, flip-flop 120 will continue to oscillate and alternately activate outputs 121 and 122.

If we assume that output 121 is active, the fluid in conduit 104 will be pressurized, causing front brakes 110 and 111 to operate, When flip-flop 120 switches, output 122 becomes activated and output 121 is deactivated. Simultaneous with the release of front brakes 110 and 111 caused by the loss of pressure in conduit 104 due to the deactivation of output 121, the fluid in conduit 105 is pressurized to operate rear brakes 112 and 113. The fluid in conduit 104 "backs up" through output 121 of flip-flop 120, through port 121b, and in to chamber 135. The fluid flow back through flip-flop 120, which is load insensitive, tends to reinforce the jet attachment on the opposite wall by creating a slight back flow in output 121.

When the brake to which the active output of device 120 connects is fully operated, the output is "loaded," that is, the flow normally exiting the device interaction region via the output is blocked. The ports 121b and 122b are now effective as bleeds to prevent the loading of the output from disrupting the normal oscillating action of device 120. The effect of such a bleed is well explained in *Fluid Amplifiers*, by Joseph M. Kirshner, McGraw-Hill, 1966, at page 201.

"The bleed removes the back pressure due to load. As the back pressure does not reach the separation bubble, the unit is stable when loaded. The excess flow which cannot egress through the loaded output exits through the two bleeds. No flow is diverted to the inactive output. The outputs are thus decoupled. Some flow is diverted back into the interaction region, forming a vortex which aids the stability of the unit."

Accordingly, it can be seen that excess flow which cannot egress through the loaded output of device 120 exits the device via ports 121b and 122b. Since this braking system must work throughout the comparatively long period of time during which brake pedal 101 is depressed, it is apparent that a continuous fluid supply will be received via conduit 103. The wheel cylinders of the individual brakes have only a limited capacity, therefore some supplementary reservoir must be provided in the system to contain the excess fluid exiting via ports 121b and 122b due to the loading of the outputs. A bellows in chamber 134 serves as this reservoir. Thus, a nominal fluid flow through device 120 is assured at all times. Although the high energy required for wall attachment of a jet can be obtained substantially from the effects of high pressure, a minimal volume flow must be sustained at all times. Thus, chamber 135 acts as a reservoir to ensure the low velocity (low volume) and high pressure fluid flow necessary for wall attachment and the proper operation of the oscillation effects of flip-flop 120.

Chamber 135 also provides a reservoir for fluid released from an operated brake's wheel cylinder as the brake is released. Since conduits 104 and 105 are being alternately pressurized and depressurized, a reservoir for this released fluid is essential to prevent this fluid from flowing back into the interaction chamber of device 120 and interfering with its proper operation. As the return spring on the wheel cylinder urges the cylinder back to its unoperated position, the fluid contained in the cylinder is bled off at respective port 121b or 122b and into chamber 135. This maintains the unoperated portion of the system at the ambient pressure and prevents interference with the active region of device 120.

As soon as brake pedal 101 is released, all the wheel cylinders depressurize as conduit 103 loses pressure and device 120 is no longer active. The pressurized fluid from the wheel cylinders, and from bellows 135, returns to master cylinder 102 just as fluid returns to the master cylinder of a conventional brake system.

When chamber 135 becomes completely filled with fluid, so that excess fluid can no longer be bled from either port 121b or port 122b, output 121 and output 122 will both become pressurized simultaneously and front brakes 110 and 111 and rear brakes 112 and 113 will be applied simultaneously as in the prior art hydraulic brake systems. At this point device 120 will cease to operate as an oscillator and will serve merely to connect conduit 103 to conduits 104 and 105. Obviously, the time duration required to reach simultaneous braking may be effectively determined by proper selection of the size of chamber 135. The size of chamber 135 could not, of course, exceed the volume of fluid pressurized in master cylinder 102. Chamber 135 could be eliminated in a pressurized air system where excess air could be bled out to the atmosphere.

To disable the system and apply the brakes at all four wheels simultaneously, valve 123 should be closed. This removes chamber 135 from the system and overrides the alternating action of device 120. The facility for disabling the alternating action might be desirable, for example, when adjusting the brakes or "bleeding" air from the hydraulic lines of the system. Some might even choose to disable the system during summertime or periods of weather when the danger of skidding is greatly reduced.

The graph of FIG. 2 shows a comparison between braking action of my invention as compared to the prior art. Chart (a) shows the full application of brake pressure on all wheels following some initial reaction time as is normal in prior art systems. Chart (b) shows the effect of manually pumping the brakes to obtain intermittent braking action to prevent skidding. Chart (c) shows the braking action of my invention which provides automatic antiskid braking. Following the initial reaction time, the front and rear brakes are alternately applied so that the continuous braking effect on the vehicle of chart (a) is approximated, while at the same time the pumping effect shown in chart (b) occurs at each brake.

A second embodiment of my invention is shown in FIG. 3. The present interest in the automotive field for improved safety has developed an almost universal demand for "fail-safe" hydraulic braking systems. My invention is also compatible with such fail-safe arrangements. Those portions of the fail-safe system shown in FIG. 3 which are the same as corresponding parts of the more economical system shown in FIG. 1 have been given the same reference characters in both Figures.

Depression of brake pedal 101 in FIG. 3 energizes master cylinder 30. Master cylinder 30 is a dual acting device commonly used to provide two simultaneous outputs at conduits 30a and 30b. An example of such a device is disclosed in U.S. Pat. No. 3,461,671 issued to Jack H. Venema on Aug. 19, 1969. Conduits 30a and 30b are combined in a fluidic half adder 31 which has its exclusive OR output connected to conduit 33 and its AND output connected to conduit 32. If master cylinder 30 is functioning properly, so that pressurized fluid flows in both conduits 30a and 30b, half adder 31 will combine the outputs and provide a fluid flow through conduit 32. Should a failure occur in either output, the exclusive OR output of half adder 31 would become active and provide a fluid flow through conduit 33.

The presence of a pressurized fluid in conduit 33 indicates a failure of master cylinder 30 since pressurized fluid is being received from only a single output of the master cylinder. The presence of pressurized fluid in conduit 33 also energizes solenoid A, the significance of which will be explained later in detail. Conduits 32 and 33 are combined by a "pill" valve 34 so that the presence of pressurized fluid in either conduit will flow into conduit 103. At the same time, interaction between conduit 32 and conduit 33, or vice versa, is prevented.

The operation of fluidic flip-flop 120 and its related hardware is the same as previously described with reference to FIG. 1. However, an additional "fail-safe" feature has been provided which becomes effective should either brake line 104 or brake line 105 rupture. FIG. 3A shows, schematically, a failure indicating system which is integral with the fail-safe arrangement. Make contact M in FIG. 3A connects battery 300 to one side of failure lamp 301 and buzzer 302 when switch 305 in FIG. 3 is operated. Switch 305 is operated by the depression of plunger 307 which occurs when pedal 101 is depressed causing actuating rod 106 to move and force arm 306 against the plunger. The other side of lamp 301 and buzzer 302 in FIG. 3A connect to ground through contacts of solenoids A, B, and C.

The system of FIG. 3 is shown as it would be if it were being operated normally, with no failures. Solenoids B and C each were initially operated by the momentary completion of an operating path through switch 305. The path is not shown, but such arrangements are well known in the art. Of course, since contact M is also controlled by switch 305, contact M would be made slow operating. This would prevent a premature operation of the alarm circuit before solenoids B and C were operated, thereby opening their respective contacts B and C. Pill valves 35 and 36 connect the respective outputs 121 and 122 of flip-flop 120 to brake lines 104 and 105 respectively. The presence of pressurized fluid in brake lines 104 and 105 causes the fluid in conduits 35a and 36a respectively to be pressurized, thereby holding pressure solenoids B and C respectively operated. The operation of solenoids B and C will position valves 35 and 36 respectively as shown. Both solenoids are slow releasing to prevent their unintended release during the period when their associated brake line is not pressurized and the brake released during normal operation.

Should a brake line rupture while the system is operating normally and the brake lines are both being pressurized (the more probable occurrence), the associated solenoid would release due to a loss of fluid pressure. For example, if brake line 104 were to rupture, conduit 35a would lose pressure and solenoid B would release. The release of solenoid B would move the pill of valve 35 to the left side, thereby interrupting the communication of output 121 with brake line 104 and establishing communication between output 121 and brake line 105 via conduit 35b. As a result, regardless of the state of flip-flop 120, brake line 105 would be pressurized.

If brake line 105 were the one to rupture, a similar occurrence would result. Conduit 36a would lose pressure, releasing solenoid C. This would move the pill FIG. valve 36 to the right and interrupt the connection of output 122 to brake line 105 and instead connect output 122 to brake line 104 via conduit 36b. In either case, the associated contact B or C in FIG. 3A would release, thereby closing a path from ground to lamp 301 and buzzer 302, causing them to operate.

The lamp and buzzer would also operate if solenoid A is actuated. The presence of pressurized fluid in conduit 33 indicates a failure of master cylinder 30, as previously described. Pressure in conduit 33 causes solenoid A to operate, thereby operating contact A in FIG. 3A and closing a path from ground to the lamp and buzzer. The operation of lamp 301 and buzzer 302 in the event of a failure is desirable since the braking action under this automatic arrangement might otherwise give the operator no indication that a failure had occurred.

It is to be understood that these embodiments were described merely to illustrate the principle of my invention. Other arrangements may be devised by those skilled in the art which do not depart from the spirit and scope of this invention. For example, while a system operating upon the front and rear brakes of an automobile was described, it should be apparent that the system could also be advantageously used for alternately activating the brakes in a motor vehicle tractor and trailer combination to prevent skidding and jackknifing.

It should also be apparent that while the system described used hydraulic fluid, it could advantageously be used where the pressurized fluid is air or any other fluid commonly used in fluidic devices and brake systems. For example, master cylinder 102 could be replaced by a reservoir of pressurized air and chamber 135 could be replaced by a vent to the atmosphere or by a return line to the reservoir.

What is claimed is:

1. A brake system for a vehicle having front and rear brakes actuated by pressurized fluid comprising
    a fluidic flip-flop having an inlet and a plurality of selectively energizable outputs, a first output being connected to the front brake and a second output being connected to the rear brake, and having a plurality of signal ports for controlling the outputs,
    means for supplying pressurizing fluid to the inlet of the flip-flop,
    control means for alternately energizing the first and second outputs to alternately actuated the front and rear brakes of the vehicle,
    a resilient fluid reservoir, and
    means connected to the first and second outputs for limiting the quantity of pressurized fluid supplied by the first and second outputs to the front and rear brakes respectively and for diverting fluid in excess of the limit from the brakes to the fluid reservoir.

* * * * *